(12) United States Patent
Deloy

(10) Patent No.: US 6,336,728 B1
(45) Date of Patent: Jan. 8, 2002

(54) FLAT PANEL DISPLAY LIGHT GUIDE

(75) Inventor: Christian T. Deloy, Marion, IA (US)

(73) Assignee: Rockwell Collins, Inc, Cedar Rapids, IA (US)

( * ) Notice: Subject to any disclaimer, the term of this patent is extended or adjusted under 35 U.S.C. 154(b) by 0 days.

(21) Appl. No.: 09/643,377

(22) Filed: Aug. 22, 2000

(51) Int. Cl.⁷ ................................................ F21V 7/04
(52) U.S. Cl. ........................ 362/31; 362/260; 362/29; 362/556; 362/558; 362/240
(58) Field of Search .................... 362/31, 260, 554, 362/556, 558, 553, 561, 29, 311, 249, 240, 237, 241; 349/62, 65, 63, 70

(56) References Cited

U.S. PATENT DOCUMENTS

| 4,950,053 | A | * | 8/1990 | Haim et al. ................. 350/345 |
| 4,971,122 | A | | 11/1990 | Shaw ........................... 362/31 |
| 5,143,433 | A | * | 9/1992 | Farrell ......................... 362/29 |
| 5,720,545 | A | | 2/1998 | Shaw ........................... 362/245 |
| 5,871,273 | A | | 2/1999 | Shaw ........................... 362/247 |
| 6,095,656 | A | * | 8/2000 | Shimura et al. .............. 362/97 |

* cited by examiner

Primary Examiner—Stephen Husar
Assistant Examiner—Bertrand Zeade
(74) Attorney, Agent, or Firm—Nathan O. Jensen; Kyle Eppele

(57) ABSTRACT

A luminaire for back lighting a flat panel display in accordance with the present invention includes a fluorescent lamp having multiple lamp sections and a stack of optical components. A light guide is positioned between the fluorescent lamp and the stack of optical components. The light guide includes a first section extending across a width of the luminaire which separates the multiple lamp sections from the stack of optical components and which is adapted to substantially uniformly distribute light from the multiple lamp sections toward the stack of optical components. The light guide also includes multiple leg sections each adapted to protrude from the first section of the light guide to positions between adjacent lamp sections or to positions between one of the lamp sections and a side wall. The multiple leg sections of the light guide redirect light from the lamp sections into the first section of the light guide.

15 Claims, 7 Drawing Sheets

FLAT PANEL DISPLAY LIGHT GUIDE

FIELD OF THE INVENTION

The present invention relates to flat panel displays. More particularly, the present invention relates to systems for backlighting flat panel displays.

BACKGROUND OF THE INVENTION

The principle of operation of flat panel displays is well-known in the art. However, for purposes of understanding the present invention it can be stated that flat panel displays, such as liquid crystal displays (LCDs), operate by reducing the transmissibility of light through a matrix of "pixel" elements when an electric field is applied. Since the effect is localized to selected pixel elements, shapes and characters can be drawn by carefully controlling the application of the electric field. Unlike cathode ray tubes, non-emissive flat panel displays are not self-illuminating. Therefore, some sort of backlighting of the flat panel display pixel matrix is typically required in order for the flat panel display to be viewed.

The design and development of high performance luminaires (backlights) for flat panel display applications presents the continuous challenge of providing more luminance and luminance uniformity, while maintaining the smallest profile depth possible. Larger displays make these requirements increasingly difficult given the current lamp technologies available. Further, the need for larger lamps, which dissipate higher levels of arc power, often results in greater difficulty with respect to thermal management of the optical components of the display.

Typically, backlighting is accomplished by locating one or more fluorescent lamps or lamp sections in a sealed cavity behind the flat panel display pixel matrix. A diffuser is generally located between the matrix and the one or more lamp sections in order to facilitate viewing of the flat panel display from a variety of angles.

Light generated by the lamps can be lost in a number of different manners. For instance, a large share of the light generated from a particular lamp section is radiated from the sides of the lamp section towards adjacent lamp sections. A significant portion of the light radiated into adjacent lamp sections is not recovered for use in backlighting the display matrix. This type of loss is sometimes referred to as lamp-to-lamp absorption. The loss of light associated with lamp-to-lamp absorption plays a role in non-uniformity of luminance provided by the backlight, while at the same time resulting in the need for additional backlighting power to adequately illuminate the display matrix. This in turn has a adverse effect on the thermal management of the flat panel display.

SUMMARY OF THE INVENTION

A luminaire for back lighting a flat panel display in accordance with the present invention includes a fluorescent lamp having multiple lamp sections and a stack of optical components. A light guide is positioned between the fluorescent lamp and the stack of optical components. The light guide includes a first section extending across a width of the luminaire which separates the multiple lamp sections from the stack of optical components and which is adapted to substantially uniformly distribute light from the multiple lamp sections toward the stack of optical components. The light guide also includes multiple leg sections each adapted to protrude from the first section of the light guide to positions between adjacent lamp sections or to positions between one of the lamp sections and a side wall. The multiple leg sections of the light guide redirect light from the lamp sections into the first section of the light guide.

DETAILED DESCRIPTION OF AN ILLUSTRATIVE EMBODIMENT

Figure 1A:
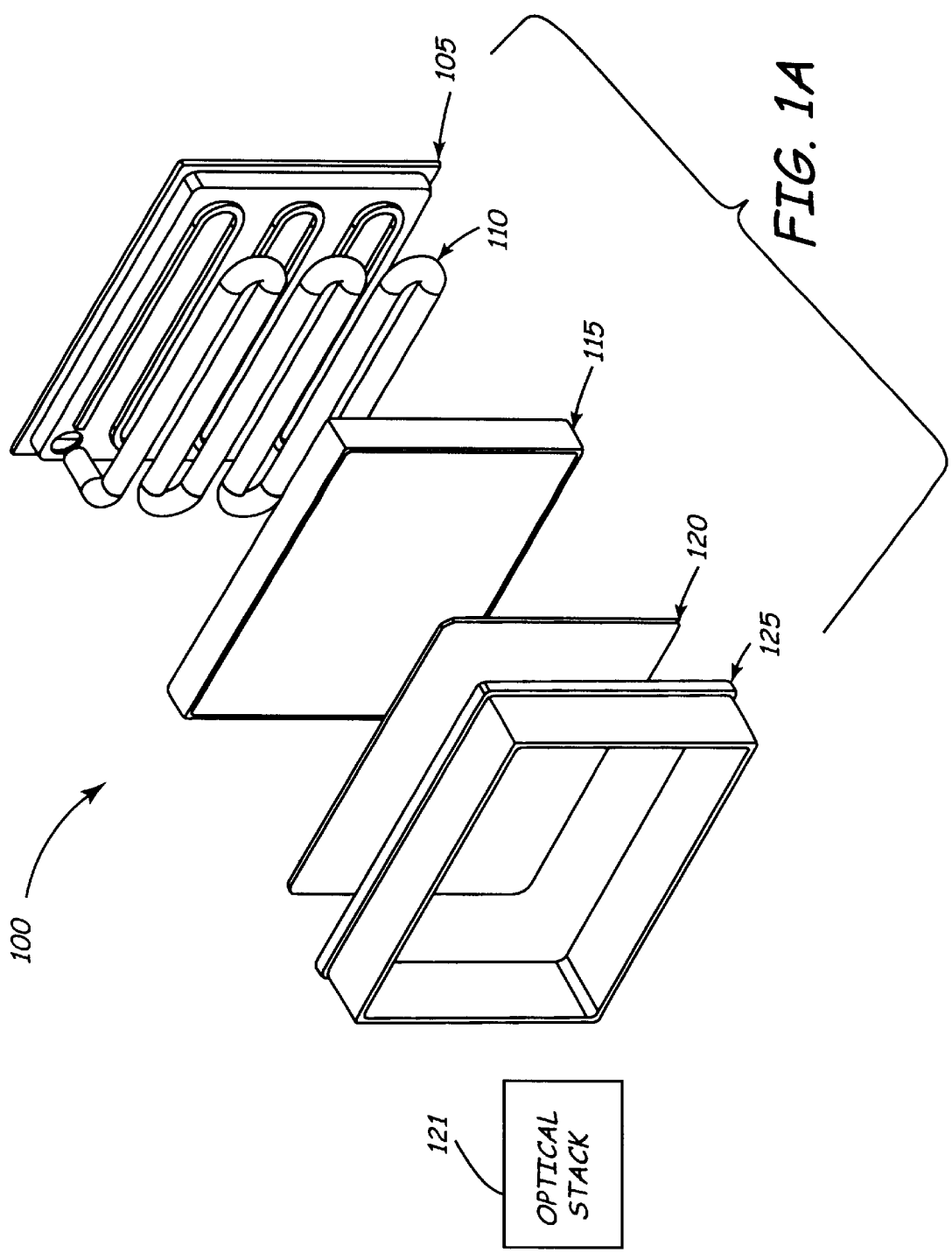
FIGS. 1A and 1B are front and rear exploded diagrammatic views of a flat panel display incorporating a light guide in accordance with the present invention.
Figure 1B:
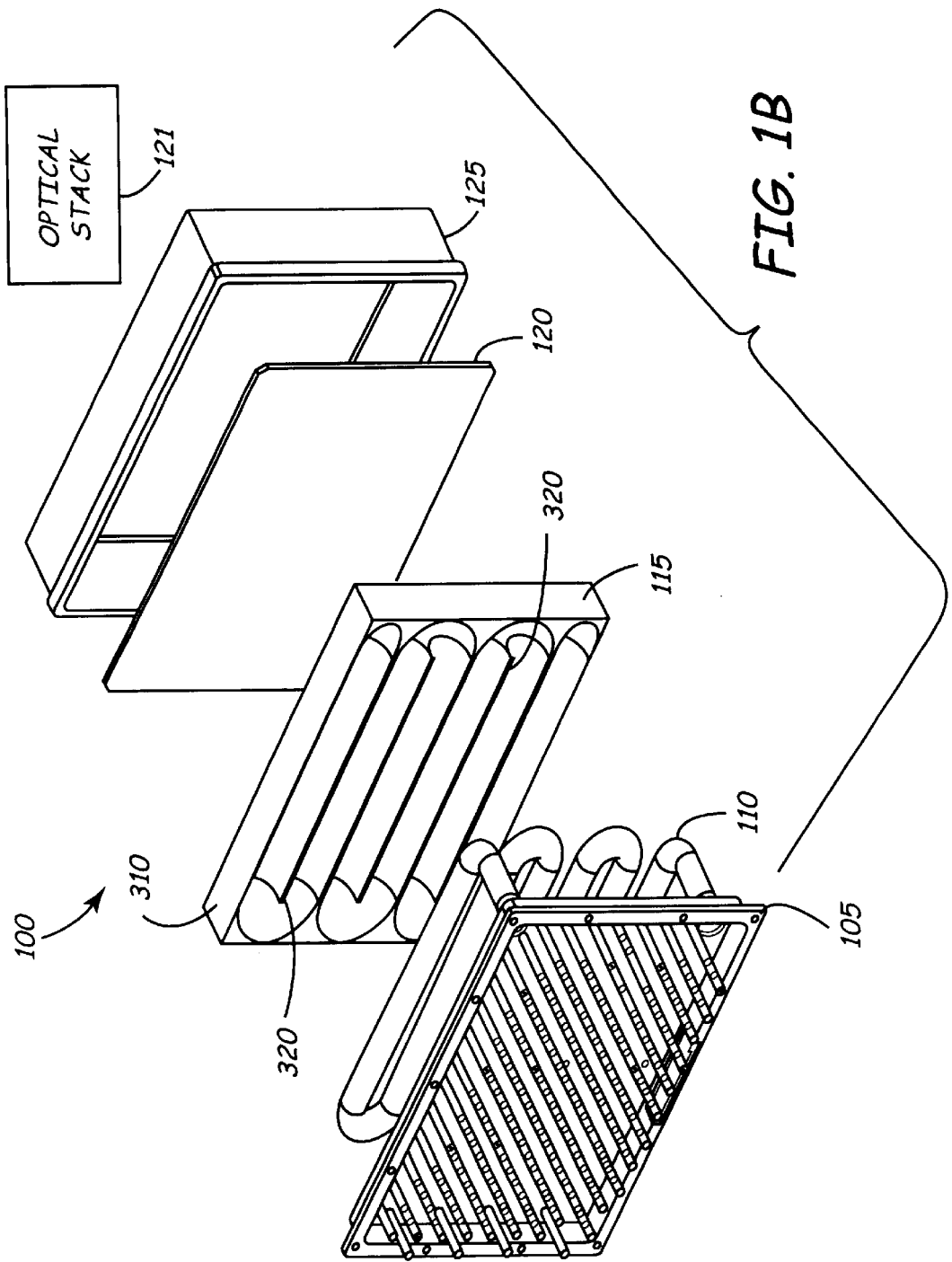

FIGS. 1A and 1B are front and rear exploded views of portions of flat panel display 100 in accordance with the invention. Portions of flat panel display 100 shown include lamp chassis 105, lamp 110, light guide 115, diffuser 120 and liquid crystal display (LCD) frame 125. Lamp chassis 105 supports fluorescent lamp 110 and optionally any drive circuitry (not shown) necessary to drive lamp 110. Lamp 110 can be a serpentine fluorescent bulb as shown, or can be other designs such as multiple serpentine, nested/interlocked serpentine, stick lamp arrays, flat lamps, etc.

Light guide 115 can be made from materials such as plastics, polycarbonates, acrylics or other materials which satisfy application requirements (structural, weight, luminance and thermal). In some embodiments of the invention, light guide 115 is formed from an acrylic material. Light guide 115 has a planar section 310 and multiple protruding sections 320 adapted to fit between adjacent sections of lamp 110 and between sections of lamp 110 and edges of flat panel display 110. Light guide 115 is discussed below in greater detail.

Diffuser 120 can be secured to light guide 115. Diffuser 120 receives light transmitted from lamp 110, and redirected through light guide 115, and distributes the light forward towards the optical stack 121 to create a blended or continuous illumination effect so that the positions of the individual lamp section are not seen when a user views the flat panel display. In some embodiments of the invention, diffuser 120 can be integrated with light guide 115, or can be an optical film attached to a front surface of light guide 115. Further, diffuser 120 can be a part of an optical stack 121. Optical stack 121 is shown diagrammatically in FIGS. 1A and 1B, but is typically supported by LCD frame 125 on the opposite side of diffuser 120 from light guide 115. Optical stack 121 can include optical components such as the LCD matrix, polarizers, compensators, and others known in the art.

The light guide of the present invention is designed to enhance display luminance and uniformity while retaining the diffuser and buffering all optical components forward of the light guide from relatively high lamp cavity temperatures. Conventionally, front surfaces of the lamp chassis and LCD frame side-walls have been machined to create complex geometrical shapes in order to reflect more light forward through the display. Unfortunately, this often resulted in mechanical parts having higher cost, complexity, and weight. The light guide of the present invention can be used to preclude the need for these machining steps, thus reducing cost and increasing luminaire efficiency by effectively guiding light forward that would have otherwise have been absorbed into various parts of the assembly. From an optical standpoint, light guide 115 provides a primary function of improving display luminance and uniformity by minimizing the amount of light absorbed by various parts of fluorescent lamp(s) 110, and by guiding light to the corners/edges of the display where areas of lower luminance would normally tend to exist.

Figure 2:
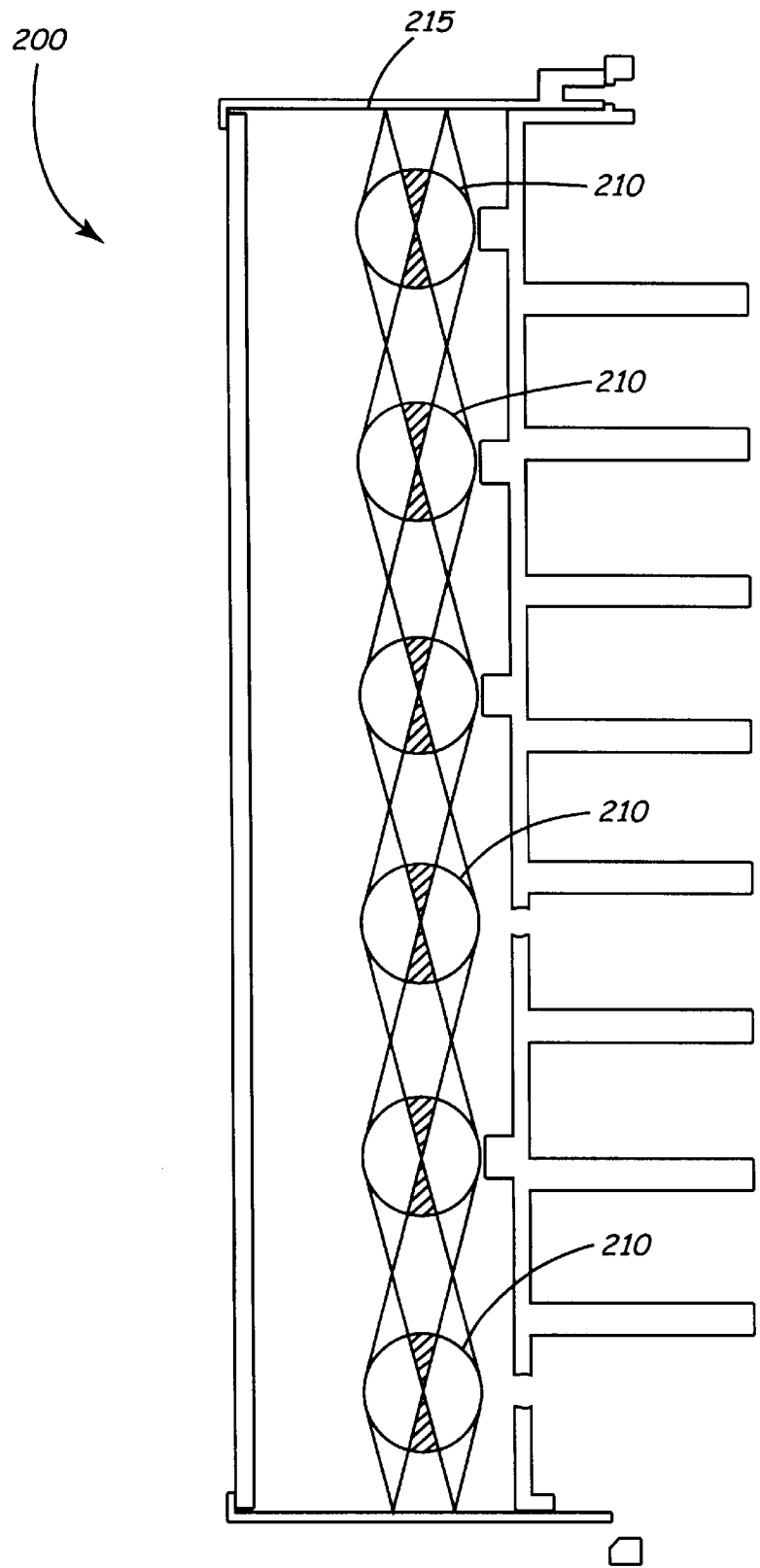
FIG. 2 is a diagrammatic sectional side view of a luminaire in a conventional backlighting system.

FIG. 2 is a diagrammatic illustration of a section of a prior art luminaire 200, cut through the center of the assembly, which provides a better understanding of the amount of light inherently affected and absorbed by neighboring lamp legs. Analyzing lamp "utility" with simplified ray tracing techniques, it can be shown that approximately 16.3% (cross-hatched areas) of the light emanating from each leg (straight section) 210 of a fluorescent lamp is affected by either an adjacent leg, of by itself when located next to the LCD frame side-wall 215. The term "affected" is used because some percentage of the light produced by these areas of lamp legs 210 is reflected off of adjacent legs, while the remaining light is transmitted into the adjacent leg and absorbed.

Figure 3A:
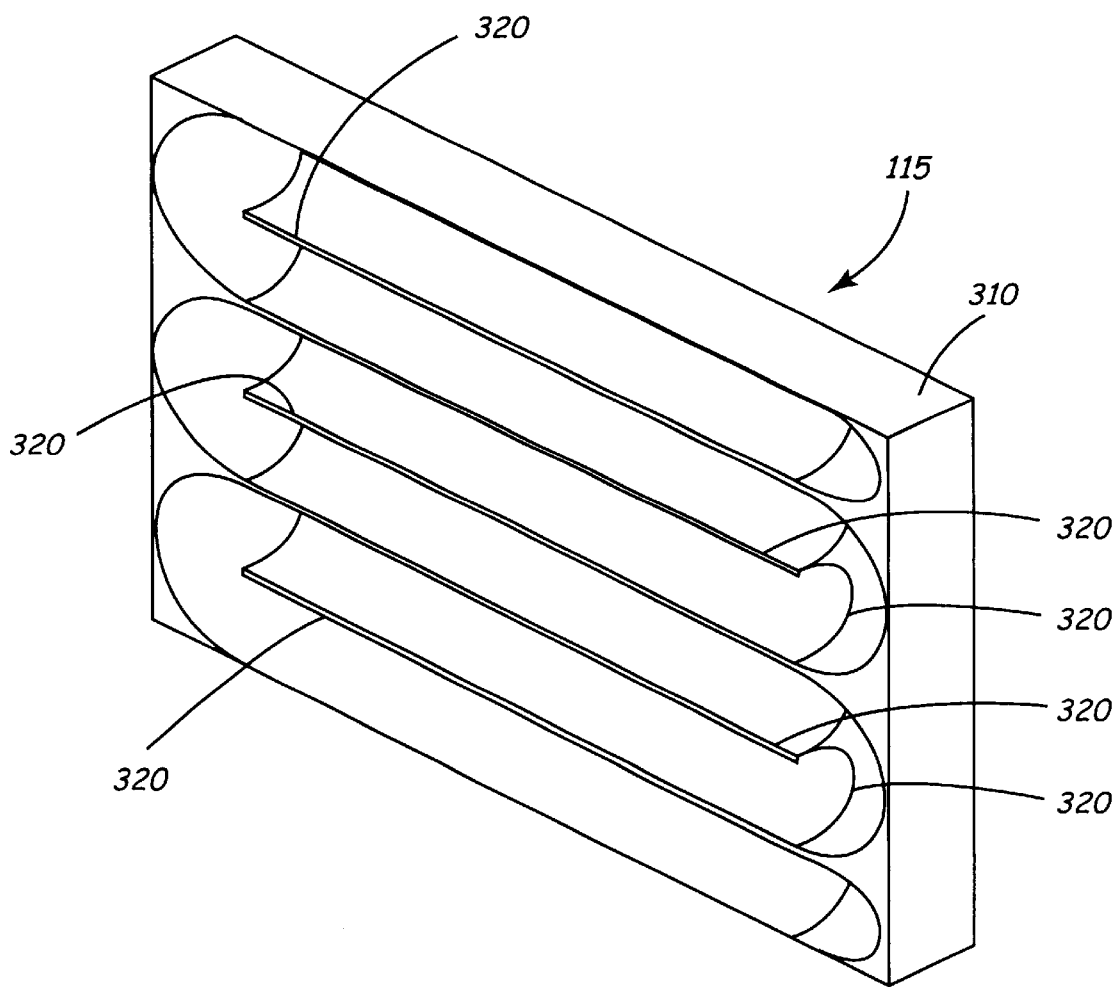
FIG. 3A is a perspective view of a light guide in accordance with embodiments of the present invention.
Figure 3B:
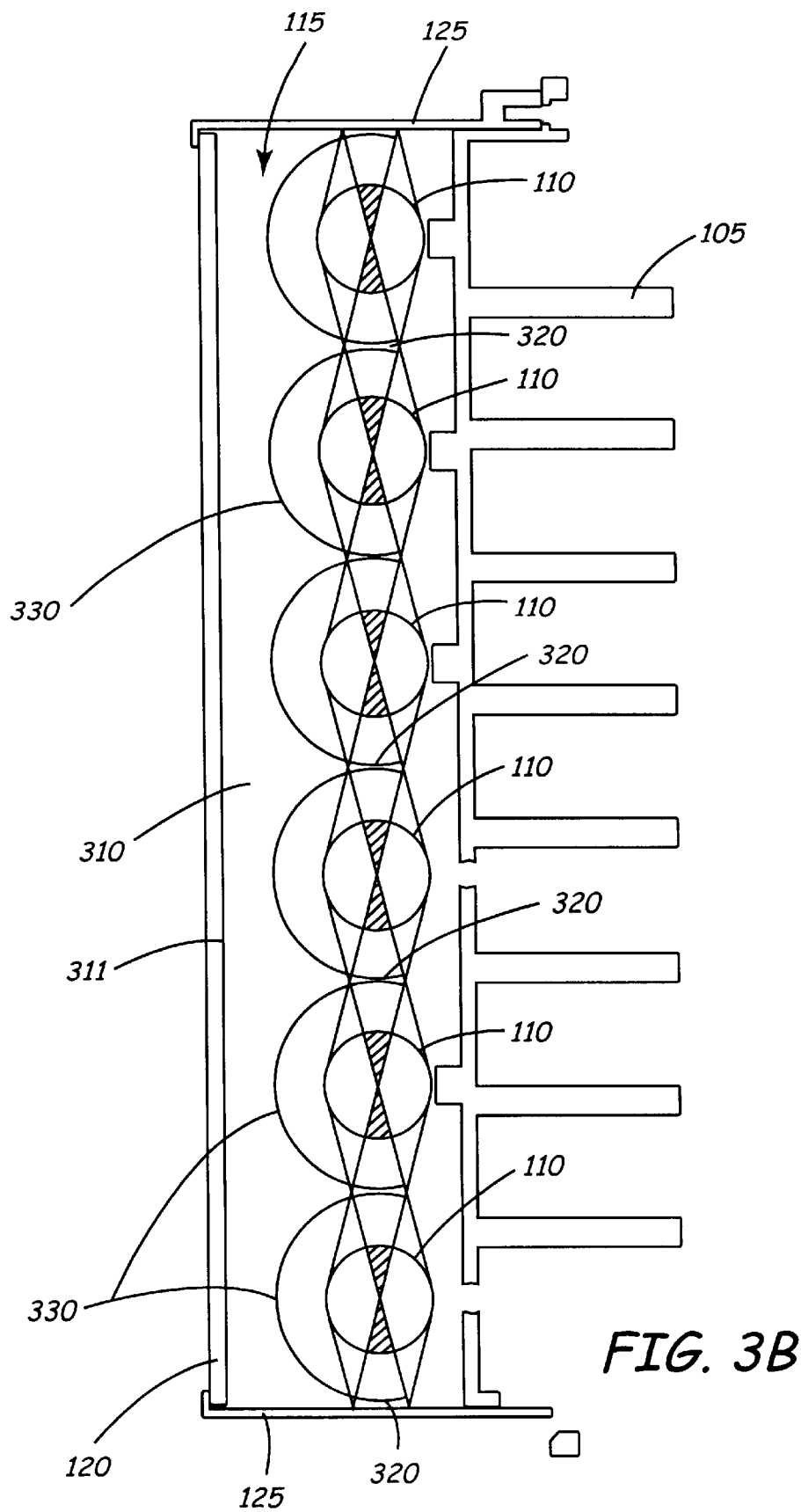
FIG. 3B is a diagrammatic sectional side view of a backlight or luminaire of the present invention which incorporates a light guide to enhance optical and thermal performance.

FIG. 3A is a perspective rear view of light guide 115 in accordance with embodiments of the invention. FIG. 3B is a section view similar to that shown in FIG. 2, with light guide 115 installed in front of fluorescent lamp 110. These figures illustrate how light guide 115 is designed to direct light produced at the phosphor inside the cross-hatched areas of the legs or sections or lamp 110 toward diffuser 120 and the front of the display. Given that total internal reflection is the means by which light can be directed forward, it can be seen that some percentage of the light in question will be transmitted through the light guide, and absorbed by an adjacent lamp leg 210 (see FIG. 5). However, considering the lambertian profile of the light exiting each point of the lamp's phosphor, some percentage of the remaining light will be reflected forward in a useful manner. By increasing the efficiency of the luminaire with a correctly designed light guide 115, optical requirements can be met using less power, and thereby presenting fewer thermal management problems.

As shown in FIGS. 3A and 3B, light guide 115 includes a substantially planar portion 310 extending in front of all sections of lamp 110, and multiple protruding leg sections 320 adapted to be positioned between adjacent legs or sections of lamp 110 or between a section of lamp 110 and a side-wall. When coupled to LCD mounting structures such as frame 125, diffuser 120 can be mounted to front surface 311 of light guide 115. Light guide 115 is shaped such that light enters the light guide with very little reflection at the air-to-light guide interface. Once inside the light guide, the light is internally reflected and redirected by the next light guide-to-air interface. In addition to redirecting portions of light which were originally radiated toward adjacent lamp sections (see cross-hatched areas) toward diffuser 120 thereby allowing diffuser 120 to be moved closer to lamp 110, light guide 115 provides thermal buffering between lamp 110 and diffuser 120 or other optical components positioned forward of the diffuser. The thermal buffering also allows lamp 110 to be moved closer to diffuser 120 and the rest of optical stack 121, thus reducing display head depth. Arcuate sections 330 of light guide 115 are adapted to curve around sections of lamp 110 to help distribute light toward corners and other "dark" areas which have conventionally been difficult to uniformly illuminate.

Figure 4:
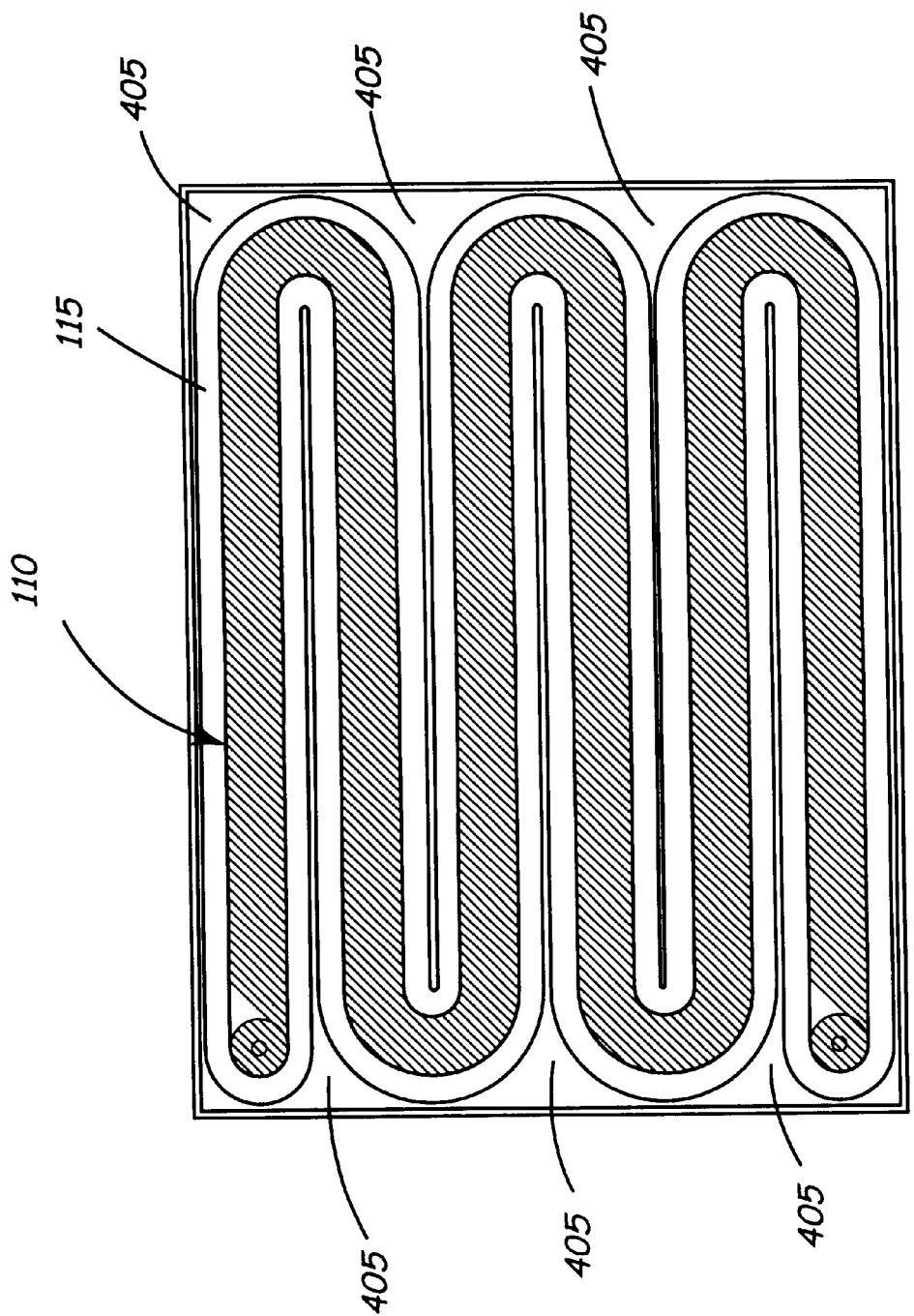
FIG. 4 is a front view of the fluorescent lamps and light guide of the luminaire of the present invention.

FIG. 4 is a diagrammatic view of lamp 110 with light guide 115 installed. By looking at the area of lamp 110 (cross-hatched area) in a two-dimensional perspective, it can be seen that a significant amount of the luminaire goes unfilled. This issue becomes increasingly difficult to address as flat panel displays get larger. The reason for this is centered around the lamp tube diameter. Larger tubes are often used to effectively fill the "dead space" 405 present in a luminaire. This works well through the straight sections of lamp 110, but drives larger bend radii in the lamp, and consequently creates larger voids between the bend areas of the lamp. Light guide 115 enhances the luminance uniformity by capturing light at the lamp, through total internal reflection within light guide 115, and directing it forward over front surface 311 (shown in FIG. 3B) of the light guide. Thus, light guide 311 both reduces loss of light due to absorption by adjacent lamp legs, and enhances luminance uniformity by redistributing light such that "dead spaces" are illuminated.

Figure 5:
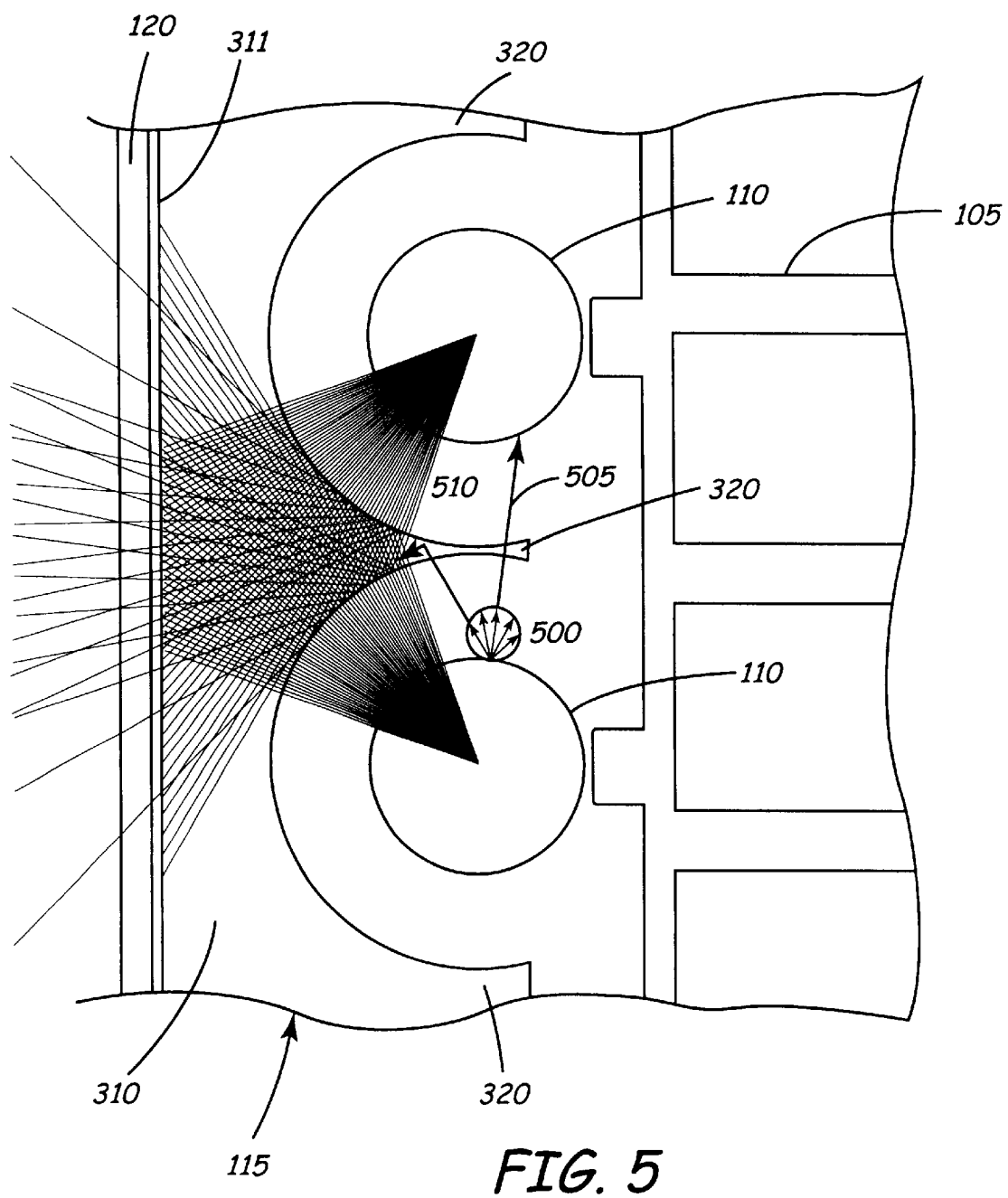
FIG. 5 is a diagrammatic sectional side view of the luminaire of the present invention illustrating the reflection of light forward through the display matrix in areas that have conventionally exhibited luminance difficulties.

FIG. 5 is a diagrammatic section view of a portion of the backlight or luminaire of flat panel display 100 having light guide 115 installed. Here it can be seen that light guide 115 reflects light (light rays illustrated as line segments originating from the center of lamps 110) forward through the display in areas that tend to be less bright ("dead space" between straight sections of the lamp). FIG. 5 also diagrammatically illustrates the lambertian profile 500 of the light, as well as portions 505 absorbed by adjacent lamp legs and portions 510 reflected forward by leg section 320. The ability to do this is significant, because it becomes apparent that lamp tube spacing and overall luminaire depth can be manipulated while also maintaining the luminance uniformity required. This capability grants the display designer the option of utilizing different lamp diameters and geometries within the luminaire while minimizing the distance between lamp 110 and diffuser 120. With respect to alternate backlight designs (such as multiple serpentine, nested/interlocked serpentine, stick lamp arrays, and flat lamps), fewer stick lamps could be incorporated with closer placement to the diffuser. Flat lamps having a shorter tube length with greater channel spacing could also be optimized with a correctly designed light guide.

From a thermal and mechanical standpoint, light guide 115 can be integrated into the display design in order to effectively retain the diffuser and buffer all optical components in front of light guide 115 from adversely high luminaire cavity temperatures. The incorporation of light guide 115 into the display's luminaire helps to protect diffuser 120 and the display stack (not shown) from damaging thermal characteristics typical of high performance backlights. Historically, it has been found that a diffuser can warp when heated to temperatures greater than 85–90° C. Permanent damage and undesirable artifacts have also resulted in the display polarizer/compensator assemblies from the same exposure. A glass substrate can be placed between lamp 110 and diffuser 120 to reduce these adverse thermal effects, but significant reflection loss would result from the additional air-glass interfaces. However, light guide 115 accomplishes the thermal buffering between lamp 110 and diffuser 120 while minimizing optical losses, and enhancing luminance uniformity as described above.

Light guide 115 can be adapted to retain diffuser 120 in place through attachment to LCD frame 125 shown in FIGS. 1A, 1B and 3B. Conventionally, flat panel displays utilize machined wedges or other devices to secure diffuser 120 in place. Substitution of these components with light guide 115 can be completed in order to lower the overall number of parts and fasteners, while at the same time improving the optical performance of the backlight and the thermal performance of the display. Further, inclusion of light guide 115 does not preclude the ability to use night vision filters when required. In fact, light guide 115 can be fashioned to retain a night vision (NVIS) filter between the diffuser and the lamp.

Although the present invention has been described with reference to illustrative embodiments, workers skilled in the art will recognize that changes may be made in form and detail without departing from the spirit and scope of the invention.

What is claimed is:

1. A luminaire for backlighting a flat panel display, the luminaire comprising:
    a fluorescent lamp having a plurality of lamp sections;
    a stack of optical components; and
    a light guide positioned between the fluorescent lamp and the stack of optical components, the light guide comprising:
        a first section extending across a width of the luminaire separating the plurality of lamp sections from the stack of optical components and adapted to substantially uniformly distribute light from the plurality of lamp sections toward the stack of optical components; and
        a plurality of leg sections, wherein each of the plurality of leg sections protrudes from the first section of the light guide to positions between adjacent ones of the plurality of lamp sections or to positions between one of the lamp sections and a side wall, the plurality of leg sections being adapted to redirect light from the leg sections of the fluorescent lamp into the first section of the light guide.

2. The luminaire of claim 1, wherein the plurality of lamp sections of the fluorescent lamp include a plurality of straight lamp sections.

3. The luminaire of claim 1, wherein the fluorescent lamp is a serpentine lamp.

4. The luminaire of claim 1, wherein the stack of optical components includes a diffuser positioned adjacent the light guide such that the light guide substantially uniformly distributes light from the plurality of lamps sections toward the diffuser.

5. The luminaire of claim 4, wherein the first section of the light guide includes a substantially planar portion extending across the width of the luminaire.

6. The luminaire of claim 5, wherein the diffuser is a substantially planar diffuser supported by the substantially planar portion of the light guide.

7. The luminaire of claim 1, wherein the light guide is formed of an acrylic material.

8. A light guide for use in a luminaire for back lighting a flat panel display, the luminaire including a fluorescent lamp having a plurality of lamps sections and a stack of optical components, the light guide comprising:
    a first section adapted to extend across a width of the luminaire to separate the plurality of lamps sections of the fluorescent lamp from a stack of optical components and adapted to substantially uniformly distribute light from the plurality of lamp sections toward the stack of optical components; and
    a plurality of legs sections, wherein each of the plurality of leg sections is adapted to protrude from the first section of the light guide to positions between adjacent ones of the plurality of lamp sections or to positions between one of the lamp sections and a side wall of the luminaire, the plurality of leg sections being adapted to redirect light from the lamp sections into the first section of the light guide.

9. The light guide of claim 8, wherein the first section includes a substantially planar section adapted to extend across the width of the luminaire to separate the plurality of lamp sections from the stack of optical components and to substantially uniformly distribute light from the plurality of lamp sections toward the stack of optical components.

10. The light guide of claim 9, wherein the substantially planar section provides a substantially planar surface adapted to support a diffuser in the flat panel display.

11. The light guide of claim 10, wherein the plurality of leg sections of the light guide extend generally from the first section of the light guide in a direction which is approximately perpendicular to the substantially planar surface.

12. The light guide of claim 11, wherein the first section and the plurality of leg sections form a plurality of substantially arcuate surfaces adapted to be positioned around the plurality of lamp sections.

13. The light guide of claim 12, wherein the first section and the plurality of leg sections of the light guide are formed from an acrylic material.

14. The light guide of claim 12, wherein the first section and the plurality of leg sections of the light guide are formed from a plastic material.

15. The light guide of claim 12, wherein the first section and the plurality of leg sections of the light guide are formed from a polycarbonate material.

* * * * *